United States Patent
Hsu et al.

(10) Patent No.: US 9,484,589 B1
(45) Date of Patent: Nov. 1, 2016

(54) MICROBIAL FUEL CELL WITH SEDIMENT AGITATOR

(71) Applicants: Lewis Hsu, Lomita, CA (US); Wayne Po-Wen Liu, San Diego, CA (US); David Bartholomew Chadwick, San Diego, CA (US); Jeffrey Asher Kagan, San Diego, CA (US)

(72) Inventors: Lewis Hsu, Lomita, CA (US); Wayne Po-Wen Liu, San Diego, CA (US); David Bartholomew Chadwick, San Diego, CA (US); Jeffrey Asher Kagan, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 232 days.

(21) Appl. No.: 14/307,036

(22) Filed: Jun. 17, 2014

Related U.S. Application Data (63) Continuation-in-part of application No. 13/965,504, filed on Aug. 13, 2013, now Pat. No. 9,166,242.

(51) Int. Cl.
*H01M 8/16* (2006.01)
*H01M 8/04* (2016.01)

(52) U.S. Cl.
CPC ........... *H01M 8/16* (2013.01); *H01M 8/04798* (2013.01)

(58) Field of Classification Search
CPC .......................... H01M 8/16; H01M 8/04798
USPC ......................................................... 429/401
See application file for complete search history.

(56) References Cited

U.S. PATENT DOCUMENTS

| | | | |
|---|---|---|---|
| 5,976,719 A | 11/1999 | Kim et al. | |
| 6,913,854 B1 | 7/2005 | Alberte et al. | |
| 7,550,224 B1 | 6/2009 | Tender et al. | |
| 8,012,616 B2 | 9/2011 | Tender | |
| 8,148,019 B2 | 4/2012 | Tender | |
| 8,232,761 B1 | 7/2012 | Thivierge | |
| 8,415,037 B2 | 4/2013 | Nealson et al. | |
| 8,430,601 B1 | 4/2013 | Chadwick et al. | |
| 8,524,402 B2 | 9/2013 | He et al. | |
| 8,663,852 B2 | 3/2014 | Nevin et al. | |
| 2010/0034050 A1* | 2/2010 | Erb | B01F 3/04248 366/342 |
| 2011/0105623 A1* | 5/2011 | Benjamin | A61K 31/10 514/711 |
| 2013/0112601 A1* | 5/2013 | Silver | C02F 3/025 210/143 |

(Continued)

FOREIGN PATENT DOCUMENTS

WO     WO 2013073284 A1 *   5/2013   ............. H01M 8/16

OTHER PUBLICATIONS

W. Liu, G. Hong, J. Kagan, L. Hsu, M. Huang, B., Dea, "Separating and reattaching microbial fuel cells on sediment bottom", IEEE Oceans 2013, Sep. 1-4, 2013.

(Continued)

*Primary Examiner* — Jonathan Jelsma
(74) *Attorney, Agent, or Firm* — SPAWAR Systems Center Pacific; Kyle Eppele; J. Eric Anderson (57) ABSTRACT

A microbial fuel cell comprising: an anode; an anode chamber configured to house the anode and an oxygen-reduced, nutrient-rich solution from a sediment bottom of a natural water body, wherein the anode chamber shields the anode from surrounding oxygen-rich water; a cathode disposed outside the anode chamber in the oxygen-rich water and electrically coupled in series to the anode via an electrical load; and an agitator configured to periodically agitate the sediment bottom to increase the quantity of nutrients in the nutrient-rich solution.

20 Claims, 12 Drawing Sheets

(56) References Cited

U.S. PATENT DOCUMENTS

| | | | | |
|---|---|---|---|---|
| 2014/0030555 A1* | 1/2014 | Winkler | ................. | H01M 8/16 429/2 |
| 2014/0315046 A1* | 10/2014 | Yoshida | ................. | H01M 8/16 429/2 |

OTHER PUBLICATIONS

Mark E. Nielson, Clare E. Reimers, & Hilmar A. Stecher; Enhanced Power from Chambered Benthic Microbial Fuel Cells; Environ. Sci. Technol. 41, 7895-7900, (2007).

Wayne P. Liu, Jeff Kagan, Lewis Hsu, Bart Chadwick; Pumping Microbial Fuel Cells; IEEE Oceans 2012, Oct. 14-19, 2012.

Hyung-Sool Lee, Prathap Parameswaran, Andrew Kato-Marcus, Ce'sar I. Torres, Bruce E. Rittmann; Evaluation of energy-conversion efficiencies in microbial fuel cells (MFCs) utilizing fermentable and non-fermentable substrates; Water Res., (2007).

Chin-Tsan Wang, Cheng Kuang Shaw, and Tzu-Yang Hu; Tamkang Journal of Science and Engineering, vol. 14, No. 1, pp. 25-31, (2011).

Tender, L. Gray, S. Groveman, E. Lowry D., Kauffman, P. "The first demonstration of a microbial fuel cell as a viable power supply: Powering a meteorological buoy", Journal of Power Source 179, 571-575 (2008).

Wotawa-Bergen, A.Q. ; Chadwick, D.B. ; Richter, K.E. ; Tender, L.M. ; Reimers, C.E. ; Gong, Y. "Operational testing of sediment microbial fuel cells in San Diego Bay", IEEE Oceans 2010, (Sep. 2010).

Yanming Gong, Sage E. Radachowsky, Michael Wolf, Mark E. Nielsen, Peter R. Girguis, and Clare E. Reimers. "Benthic microbial fuel cell as direct power source for an acoustic modem and seawater oxygen/temperature sensor system", Environ. Sci. Technol. 2011, 45, 5047-5053 (2011).

Schrader, Paul S.; Doolan, Cody; Reimers, Clare; Girguis, Peter; Wolf, Michael; Green, Dale. "Sensors and acoustic modems powered by benthic microbial fuel cells at the MARS observatory", IEEE Oceans 2013, 1-6, (Sep. 2013).

\* cited by examiner

MICROBIAL FUEL CELL WITH SEDIMENT AGITATOR

CROSS-REFERENCE TO RELATED APPLICATION

This application is a continuation-in-part of prior U.S. application Ser. No. 13/965,504, filed 13 Aug. 2013, titled "Multi-Modal Energy Harvester" (Navy Case #101518), which application is hereby incorporated by reference herein in its entirety for its teachings.

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102568.

BACKGROUND OF THE INVENTION

Figure 1A:
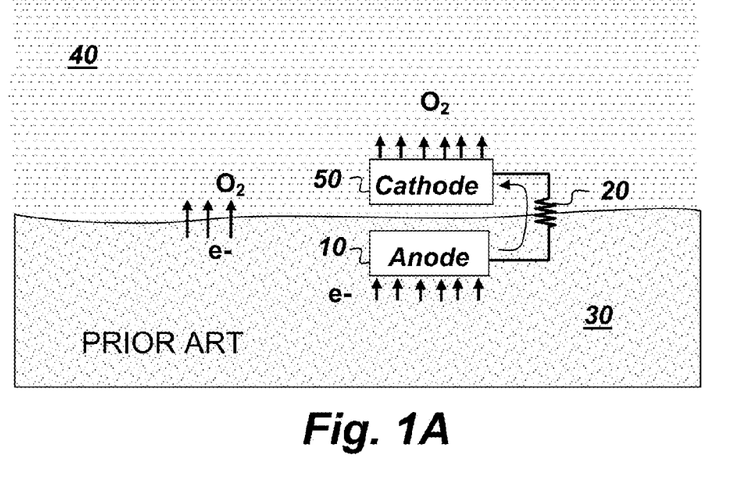
FIGS. 1A and 1B are side-view illustrations of prior art microbial fuel cells.

Typical prior art microbial fuel cells, such as the one depicted in FIG. 1A, used buried anode structures 10 to capture free electrons generated when bacteria metabolize sediment-based nutrients. An electrical circuit is formed when the captured electrons are passed thru an electrical load 20 (or battery) en route to sources of dissolved oxygen. Burying the anodes 10 yields a natural bifurcation of the anaerobic sediment 30 and oxygen rich seawater 40 and produces a voltage potential between the anodes 10 and cathodes 50. Any leakage or diffusion of oxygen towards the anodes 10 simply shorts out the electron flow and prevents the microbial fuel cell from operating.

Figure 1B:
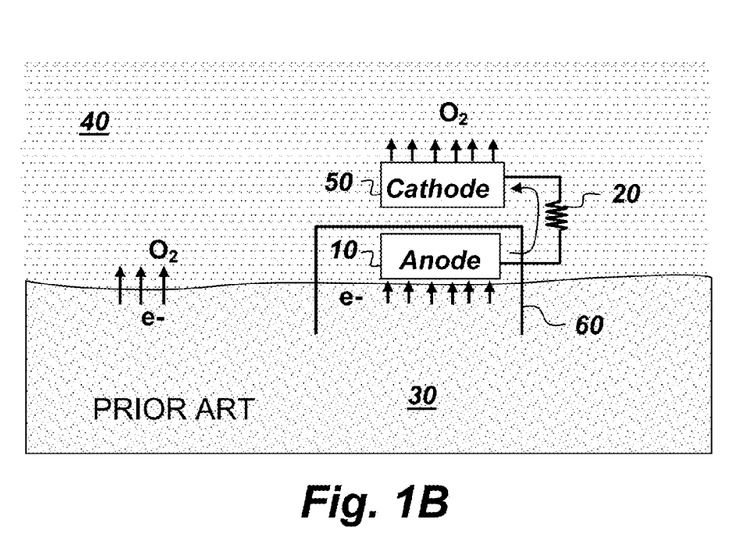

Some prior art microbial fuel cell designs, such as the design shown in FIG. 1B, deploy the anodes 10 within a chamber 60 that creates an oxygen-free (anaerobic) condition about the anodes 10. This design eliminates the need for burying the anode structure 10 as the chamber 60 serves as a barrier against dissolved oxygen in the ambient seawater 40 provided there is an adequate seal with the sediment 30. A need exists for an improved microbial fuel cell.

SUMMARY

Disclosed herein is a microbial fuel cell comprising an anode, an anode chamber, a cathode, and an agitator. The anode chamber is configured to house the anode and an oxygen-reduced, nutrient-rich solution from a sediment bottom of a natural water body. The anode chamber is further configured to shield the anode from surrounding oxygen-rich water. The cathode is disposed outside the anode chamber in the oxygen-rich water and is electrically coupled in series to the anode via an electrical load. The agitator is configured to periodically agitate the sediment bottom to increase the quantity of nutrients in the nutrient-rich solution.

An embodiment of the microbial fuel cell may be described as comprising an anode, a cathode, an anode chamber, a depletion chamber, an ingestion chamber, and a fluid transfer device. The anode chamber is configured to house the anode in an oxygen-reduced, nutrient-rich solution. The anode chamber is further configured to prevent an oxygen-rich water from entering the anode chamber. The depletion chamber (which contains an oxygen-depleting substance capable of removing oxygen from fluid in the depletion chamber) is hydraulically coupled to the anode chamber via at least one check valve. The ingestion chamber is hydraulically coupled to the depletion chamber via at least one check valve, and the ingestion chamber has an open end that is configured to be exposed to a source of nutrient-rich solution. The fluid transfer device is configured to move the nutrient-rich solution from the ingestion chamber into the depletion chamber where the nutrient-rich solution is depleted of oxygen. The fluid transfer device is further configured to move the oxygen-depleted solution from the depletion chamber into the anode chamber where electrons from the oxygen-depleted solution are captured by the anode. Additionally, the fluid transfer device is further configured to move the oxygen-depleted solution out of the anode chamber into the oxygen-rich water. The cathode is disposed outside the anode chamber in the oxygen-rich water and is electrically coupled in series to the anode via an electrical load.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 2:
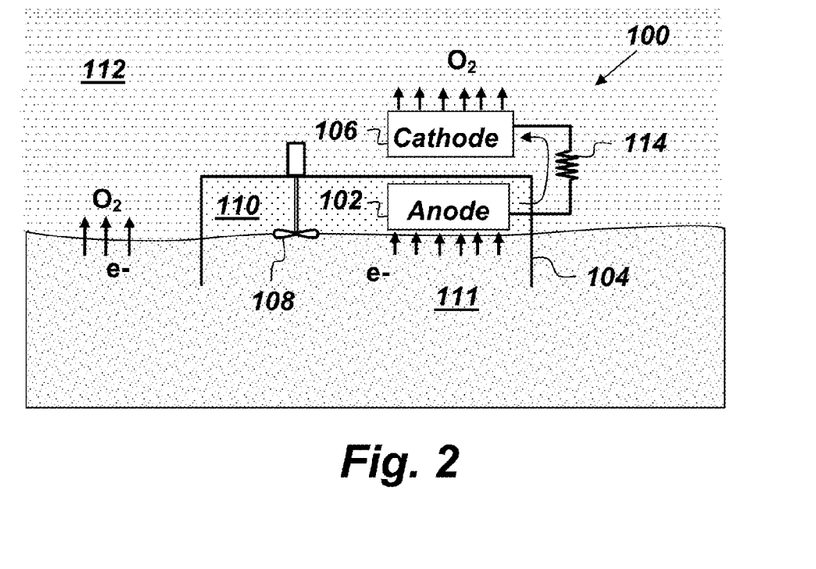
FIG. 2 is a side-view illustration of an embodiment of a microbial fuel cell.

FIG. 2 is a side-view illustration of a microbial fuel cell (MFC) 100 that comprises, consists of, or consists essentially of an anode 102, an anode chamber 104, a cathode 106, and an optional agitator 108. The anode chamber 104 is configured to house the anode 102 such that the anode 102 is exposed to an oxygen-reduced, nutrient-rich solution 110 from a sediment bottom 111. The anode chamber 104 also serves to shield the anode 102 from surrounding oxygen-rich water 112. The cathode 106 is disposed outside the anode chamber 104 in the oxygen-rich water 112 and electrically coupled in series to the anode 102 via an electrical load 114.

The agitator 108 may be configured to periodically agitate the sediment bottom 111 to increase the quantity of nutrients in the nutrient-rich solution 110.

The anode 102 may be sized, shaped, formed, and/or positioned in any way to provide exposure to the oxygen-reduced, nutrient-rich solution 110 within the anode chamber 104. The anode 102 may be constructed of any material capable of receiving electrons from the nutrient-rich solution 110. Suitable examples of anode material include, but are not limited to, carbon cloth, graphite chips/plates, graphite rods, graphite adhesives or coatings, graphite or carbon brush, activated carbon granules, and platinum materials. The anode 102 may also optionally be coated with any number of special additives or coatings (mediators) that facilitate electron transfer between the anode 102 and microbes and/or the anode chamber 104 may further contain additives that promote or accelerate microbial growth.

The anode chamber 104 may be any oxygen-impermeable chamber capable of separating the oxygen-rich water 112 from the oxygen-reduced, nutrient-rich solution 110 within the anode chamber 104. The oxygen-rich water 112 may be any aqueous, microbial environment where bacteria and organic matter are present. Suitable examples of the oxygen-rich water 112 include, but are not limited to, marine environments, bodies of fresh water, and waste-water environments. The term "natural water body" as used herein means any naturally-occurring body of water and does not include wastewater treatment facilities.

The cathode 106 may be constructed of any material capable of transferring electrons into the oxygen-rich water 112. Suitable examples of cathode material include, but are not limited to, carbon cloth, graphite chips/plates, graphite rods, graphite adhesives or coatings, graphite or carbon brush, activated carbon granules, and platinum materials. The cathode 106 may also optionally be coated with any number of special additives or coatings (mediators) that facilitate electron transfer.

The agitator 108 may be any device capable of agitating, stirring, churning, and/or disturbing the sediment bottom 111 so as to cause nutrients to be suspended in the nutrient-rich solution 110. Suitable examples of the agitator 108 include, but are not limited to, an electro-mechanical device, an acoustic or pneumatic device, a blade, a roller, a rake, a plow, a blowing device, a rotating brush, an impeller, a propeller, a vibrator, a stirring rod, and a device for releasing or injecting a gas or fluid into the sediment 111. In an embodiment of the MFC 100 where the nutrient-rich solution 110 is sediment pore water from an ocean floor, the agitator 108 may be an impeller configured to stir up the sediment 111 on the ocean floor. By way of example, the agitator 108 may be electrically powered, mechanically powered, powered by energy from the MFC 100, and/or powered by harvested ambient energy from a source other than the MFC such as, but not limited to, solar energy, wind energy, and/or flow-induced vibrations.

The nutrient-rich solution 110 may be any microbial fuel source (solid, liquid, or gas) that comprises, consists of, or consists essentially of organic matter. The nutrient-rich solution 110 may optionally be kept under anaerobic conditions such that the nutrient-rich solution 110 has reduced oxygen content when compared to the oxygen-rich water 112. Suitable examples of nutrient-rich solution 110 include, but are not limited to, benthic sediment pore water, wastewater, and fresh water that comprises organic matter. The nutrient-rich solution 110 may optionally be stored in an organic matter reservoir.

Figure 3:
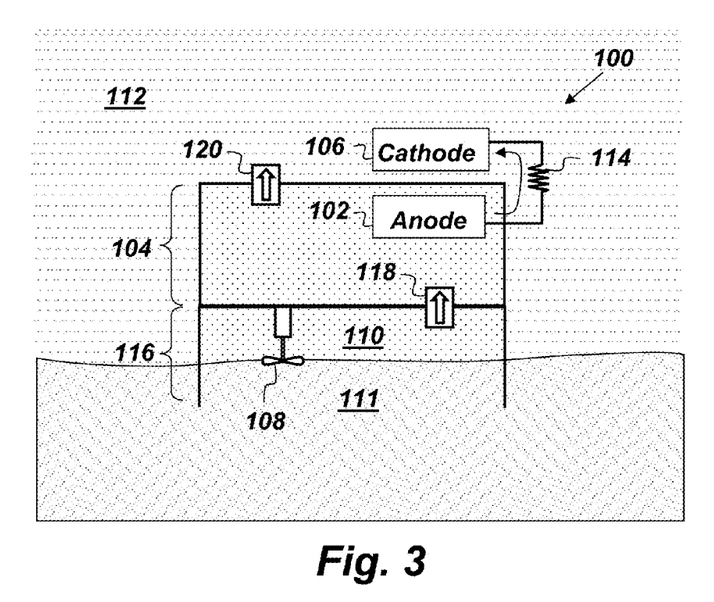
FIG. 3 is a side-view illustration of an embodiment of a microbial fuel cell.

Even though the load in FIG. 2 is depicted as a resistor, it is to be understood that the load 114 may be any electrical load. Suitable examples of the load 114 include, but are not limited to, a resistive load, a motor, a potentiometer, any electrical energy storage device such as a battery and/or capacitor, and any combination thereof. The load 114 may be gated or controlled to precisely meter current flow to maintain desired voltage levels. The load 114 is electrically connected in series between the anode 102 and the cathode 106. The load 114 may be a single electrical device or a combination of several electrical devices. The MFC 100 may be used to power any number of devices including, but not limited to, a turbidity meter, a chlorophyll-a fluorometer, a sensor for measuring conductivity, temperature and/or depth, a backscattering meter, a wireless temperature probe/transmitter, an acoustic receiver, an acoustic or radio frequency (RF) modem, a propulsion device, and a charging station FIG. 3 is a side-view illustration of an embodiment of the MFC 100 that comprises the anode 102, the anode chamber 104, the cathode 106, and an ingestion chamber 116. The ingestion chamber 116 may be hydraulically coupled to the anode chamber 104 via at least one inlet check valve 118 that permits the nutrient-rich solution 110 from the ingestion chamber 116 to enter the anode chamber 104. The ingestion chamber 116 may be designed to rest on, and sink partially into, the sediment bottom 111. In the embodiment of the MFC 100 portrayed in FIG. 3, the agitator 108 is housed in the ingestion chamber 116 and the anode chamber 104 comprises at least one exit check valve 120. The exit check valve 120 permits fluid to exit the anode chamber 104 into the surrounding water 112.

Figure 4:
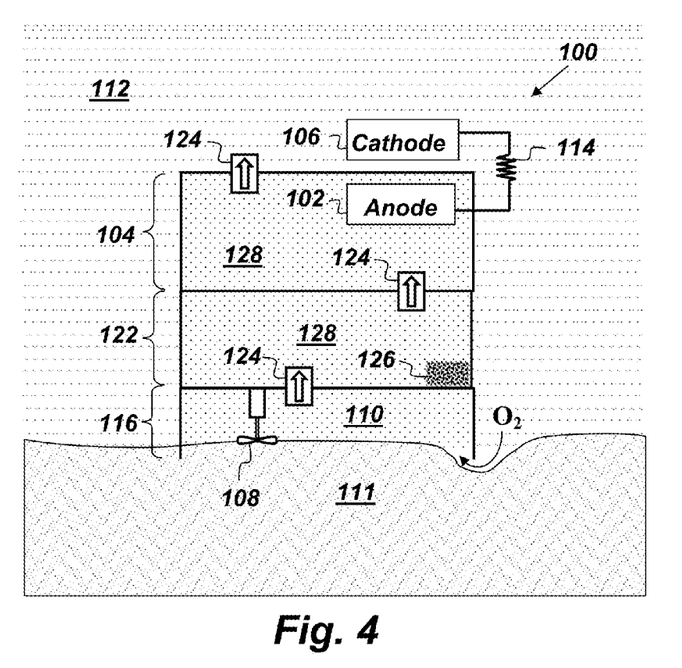
FIG. 4 is a side-view illustration of an embodiment of a microbial fuel cell.

FIG. 4 is a side-view illustration of an embodiment of the MFC 100 that comprises the same elements as the embodiment of the MFC 100 shown in FIG. 3 with the addition of a depletion chamber 122. The depletion chamber 122 may be hydraulically coupled in series between the anode chamber 104 and the ingestion chamber 116 with check valves 124 such that only one-way fluid flow is permitted from the ingestion chamber 116 to the depletion chamber 122 and then from the depletion chamber 122 to the anode chamber 104. The depletion chamber 122 may contain an oxygen depleting substance 126 that is capable of removing oxygen from the nutrient-rich solution 110 in the depletion chamber 122 to create an oxygen-reduced solution 128.

Benthic MFCs, whether buried or chambered, are susceptible to being "shorted out" when part of the anode becomes unburied in the case of a buried MFC or when oxygen-rich water 112 finds a path into the chamber—often due to burrowing organisms in the sediment bottom 111. In the embodiment of the MFC 100 shown FIG. 4, the agitator is disposed in the ingestion chamber 116 where it is configured to interact with the sediment bottom 111 so as to cause nutrients in the sediment to be suspended in the nutrient-rich solution 110. The agitated, nutrient-rich solution 110 then may enter the depletion chamber 122 through the check valve 124. Once in the depletion chamber 122, the oxygen depleting substance 126 begins to remove oxygen from the nutrient-rich solution 110—resulting in the oxygen-reduced solution 128. The oxygen-depleting substance 126 may be any oxygen-depleting agent. A suitable example of the oxygen depleting substance 126 includes, but is not limited to, bacteria-laden mud from the sediment bottom 111. The depletion chamber 122 may serve as a holding tank where oxygen in the nutrient-rich solution 110 can be naturally consumed by the oxygen depleting substance 126. The bacterial breakdown of nutrients suspended in the nutrient-rich solution 110 by the oxygen depleting substance 126 will deplete the oxygen brought into the depletion chamber 122 from the ingestion chamber 116. The oxygen-reduced solution 128 in the depletion chamber 122 may then pass through one of the check valves 124 into the anode chamber 104. The anode chamber 104 contains the anode 102 where bacterial populations may colonize to metabolize the nutrients in the oxygen-reduced solution 128 and pass electrons through the load 114 to the cathode 106. Thus, even if the oxygen-rich water 112 enters the ingestion chamber 116, such as is depicted in FIG. 4, the MFC 100 will not short out because the oxygen content of nutrient-rich solution 110 is reduced in the depletion chamber 122 before the solution reaches the anode 102.

Figure 5A:
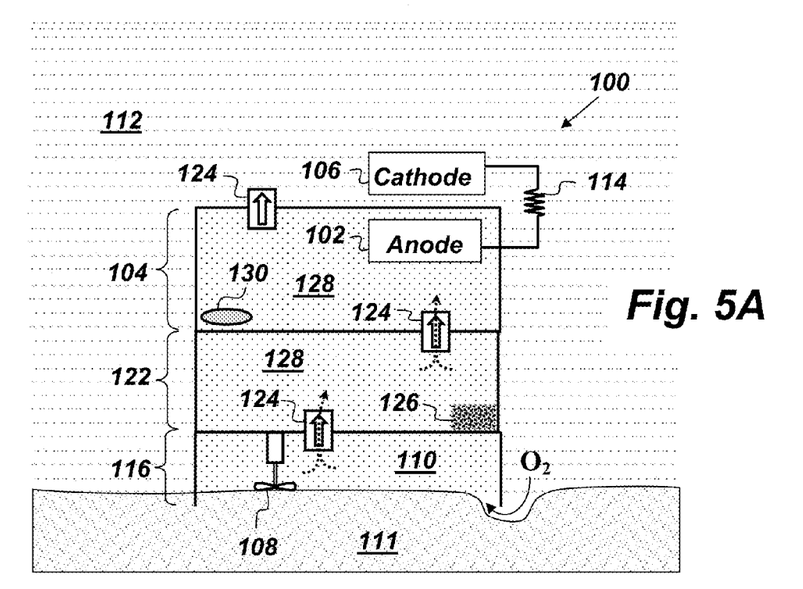
FIGS. 5A and 5B are side-view illustrations of an embodiment of a microbial fuel cell.
Figure 5B:
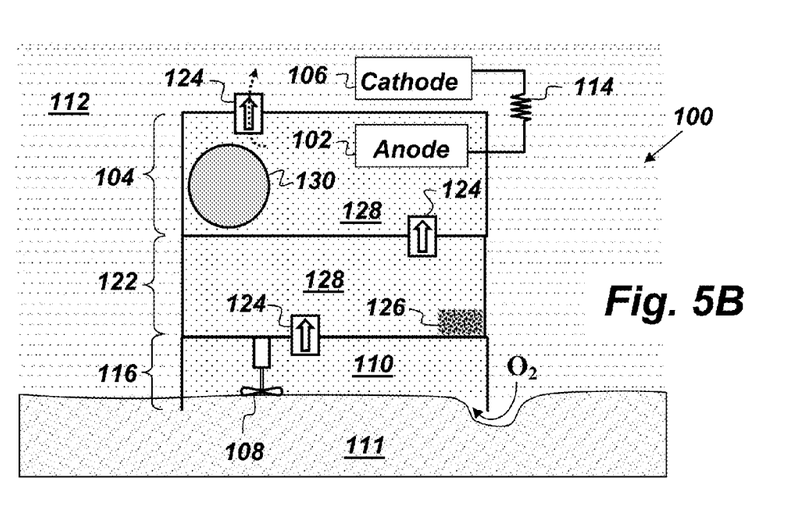

FIGS. 5A and 5B are side-view illustrations of an embodiment of the MFC 100 that comprises the same elements as the embodiment of the MFC 100 shown in FIG. 4 with the addition of a fluid transfer device 130. The fluid transfer device 130 may be configured to cause fluid to move through the check valves 124 connecting the ingestion chamber 116, the depletion chamber 122, and the anode chamber 104. The fluid transfer device 130 may be any device capable of moving fluid through a chambered MFC. Suitable examples of the fluid transfer device 130 include, but are not limited to, devices that utilize electrowetting behavior, electrocapillary phenomena, thermo-capillary convection, electro-kinetic (voltage driven) effects, and mechanical or gas displacement. For example, tide height changes and flow induced vibration effects can also be used to both power the agitator 108 to agitate the sediment and to power the fluid transfer device 130 to transfer fluids between chambers without resorting to stored battery power. In the embodiment of the MFC 100 depicted in FIGS. 5A-5B, the fluid transfer device 130 is a gas-filled balloon contained in one of the chambers (shown in the anode chamber 104 in FIGS. 5A-5B). This embodiment of the fluid transfer device may be powered by ambient, recurring processes such as hydrostatic pressure decreases and increases due to rising and decreasing tides. For example, if the embodiment where the MFC 100 depicted in FIGS. 5A-5B were to be placed on the sediment floor of a coastal marine environment then under low tide conditions (such as is depicted in FIG. 5B) the balloon would expand thereby forcing the oxygen-reduced solution 128 out of the anode chamber 104 into the surrounding ocean. As the tide rises (such as is depicted in FIG. 5A), the balloon would contract under the added pressure and the oxygen-reduced solution 128 in the depletion chamber 122 would be drawn into the anode chamber 104. Even though the balloon is depicted in the anode chamber 104 in FIGS. 5A and 5B, it is to be understood that this embodiment of the fluid transfer device 130 would also work if the balloon were located in any of the other chambers. Alternatively, each chamber may have its own separate gas-filled balloon.

Figure 6A:
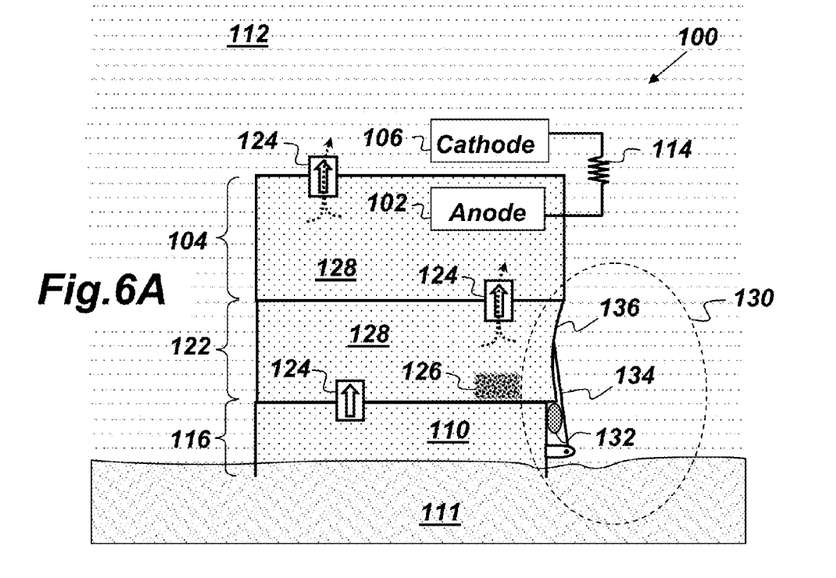
FIGS. 6A and 6B are side-view illustrations of an embodiment of a microbial fuel cell.
Figure 6B:
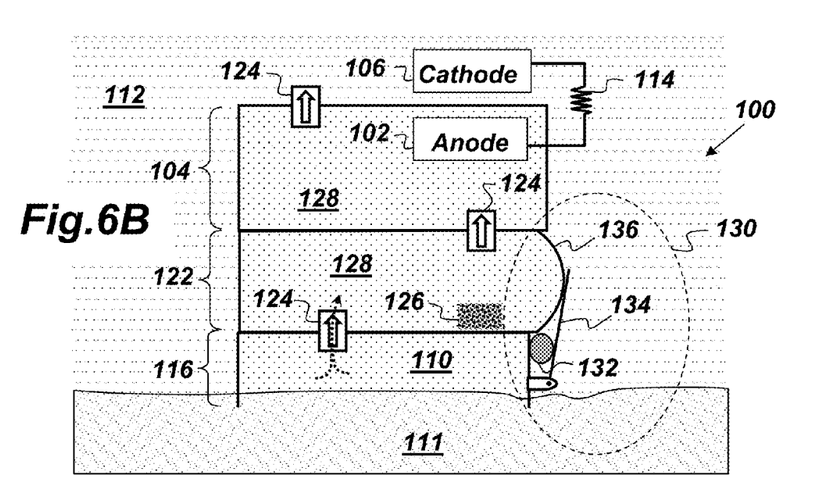

FIGS. 6A and 6B are side-view illustrations of another embodiment of the fluid transfer device 130. In this embodiment, the fluid transfer device 130 comprises a gas-filled balloon 132 designed to expand and contract due to recurring ambient pressure changes such as tide changes or a vessel passing overhead. With each expansion and contraction the balloon 132 actuates a lever 134. The lever 134, in turn, manipulates a diaphragm 136. The diaphragm 136 may be hydraulically coupled to one of the chambers of the MFC 100 such that flexing of the diaphragm 136 causes fluid to move through chambers of the MFC 100. In FIGS. 6A and 6B, the diaphragm 136 forms one of the walls of the depletion chamber 122.

Figure 7:
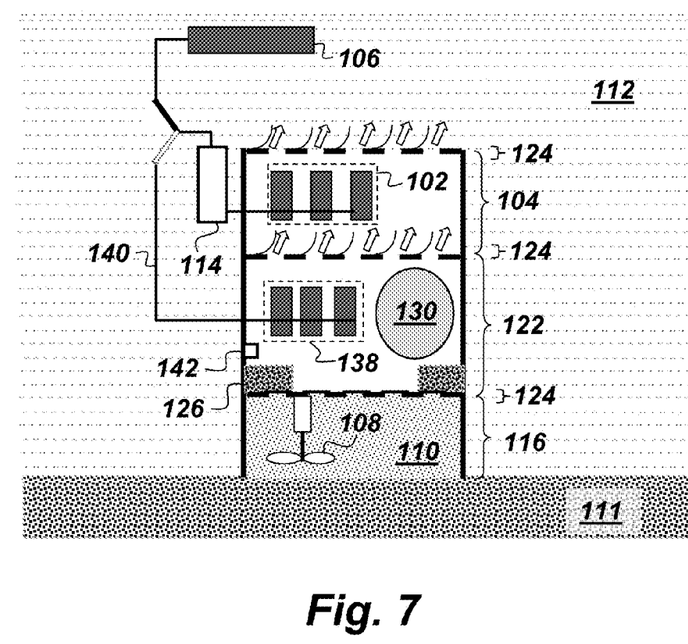
FIG. 7 is a side-view illustration of an embodiment of a microbial fuel cell.

FIG. 7 is a side-view illustration of an embodiment of the MFC 100 comprising an auxiliary cathode 138 disposed within the depletion chamber 122 and electrically and switchably coupled to the anode 102. The auxiliary cathode 138 may be a single cathode or a set of cathodes electrically coupled to a switchable line 140 such that the anode 102 may selectively be electrically connected to either the cathode 106 or the auxiliary cathode 138. The auxiliary cathode 138 may be used to help deplete the oxygen content of the oxygen-reduced solution 128 by routing electrons from the anode chamber 104 to the depletion chamber 122. Also shown in FIG. 7 is an oxygen sensor 142 that is disposed in the depletion chamber 122. The oxygen sensor 142 is configured to measure oxygen levels in the oxygen-reduced solution 128 in the depletion chamber 122. The check valves 124 may be actively controlled such that they may be selectively opened and closed. For example, the check valves 124 may be configured to only allow fluid to flow between chambers once the oxygen sensor 142 detects a threshold level of oxygen in the depletion chamber 122.

The multi-chambered embodiments of the MFC 100 can have a leaky ingestion chamber 116 where nutrients from the sediment bottom 111 and oxygen content are drawn in. This oxygen content will eventually be depleted by the depletion chamber 122 where the oxygen depleting substance 126 absorbs the oxygen. Thus, the multi-chambered embodiments of the MFC 100 can be separated from, or lifted off of, the sediment bottom 111 for in-water column profiling or measurements without risking exposure of the anode 102 to the poisonous oxygen content of the ambient, oxygen-rich water 112. In an embodiment of the MFC 100, the ingestion chamber 122 is configured to rest on, and partially sink into, the sediment bottom 111, and the load 114 is a power supply for an autonomous platform that is configured to periodically lift the MFC 100 off the sediment bottom 111. Thus, for example, the MFC 100 may be utilized as the power source for: marine temperature, conductivity, and/or pressure sensors; oceanographic equipment such as acoustic modems, pop-up buoys, etc.; autonomous underwater vehicles and gliders; and charging stations. For example, the multi-chambered embodiments of the MFC 100 can be used to power a water column sensor that repeatedly bottoms (to secure new mud and nutrients) and ascends (to make measurements). The agitator 108 may be pulsed intermittently while creating great turbulence, mixing, and capture of sediment nutrients with little power. The oxygen depletion substance 126 in the depletion chamber 122 may be replenished with new mud/bacteria every time nutrient-rich solution 110 is drawn into the depletion chamber 122 from the ingestion chamber 116. The anode 102 is sequestered from the oxygen content of the depletion and ingestion chambers 122 and 116 respectively. The MFC 100 may be configured such that the anode 102 only receives the nutrients after oxygen depletion is performed to a satisfactory level as measured by the oxygen sensor 142. The power needed to drive the agitator 108 is low as well as the power for periodically moving fluid through the chambers. Since constant, high speed recirculation is not necessary, the MFC 100 can generate a net positive energy production.

Figure 8:
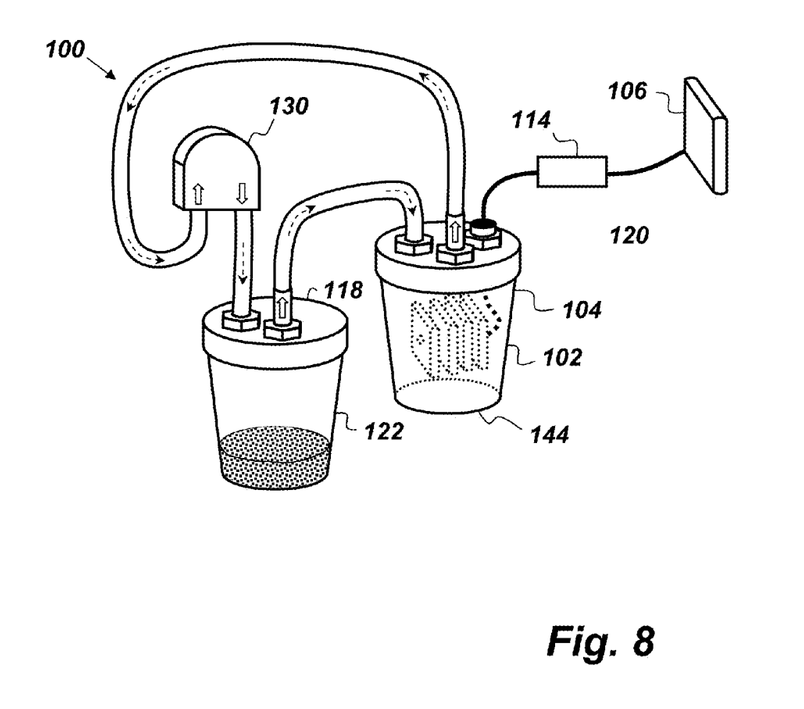
FIG. 8 is a perspective-view illustration of an embodiment of a microbial fuel cell.

FIG. 8 is a perspective view of a prototype setup of the MFC 100. In this prototype embodiment, the anode 102 was four graphite chips electrically connected in parallel, each anode chip having the dimensions 2.54 cm×3.81 cm×0.3175 cm (1 inch×1.5 inch×⅛ inch) and separated from each other by a 0.635 cm (¼ inch) gap. The anode chamber 104 may also contain a microbial activity enhancing agent 144, such as the carbon granules depicted in FIG. 8. In the prototype embodiment of the MFC 100 depicted in FIG. 8, the fluid transfer device 130 was a peristaltic pump, the oxygen-depleting substance was marine sediment, and the load 114 was an array of parallel resistors. In the prototype embodiment shown in FIG. 8, the nutrient-rich solution 110/oxygen-reduced solution 128 was recirculated slowly via the peristaltic pump between the depletion chamber 122 and the anode chamber 104. In this embodiment, a researcher performed the functions of the ingestion chamber 116 and the agitator 108 by measuring and pouring a 1% mud solution into the depletion chamber 122 and then shaking the depletion chamber 122.

Figure 9:
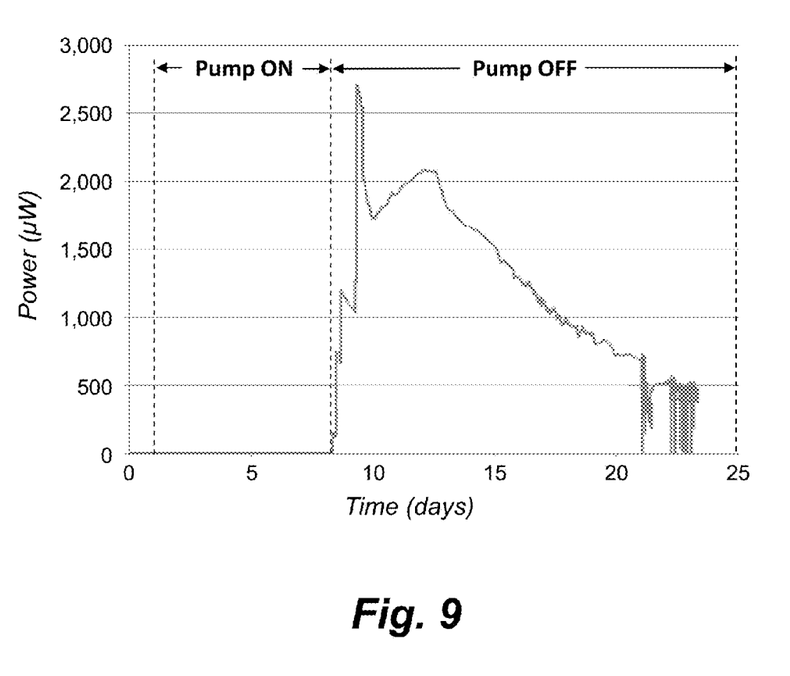
FIG. 9 is a plot showing measured power output of an embodiment of a microbial fuel cell over time.

FIG. 9 is a plot of power output over time of the prototype MFC 100 depicted in FIG. 8, where carbon granules filled the bottom third of the anode chamber 104, the oxygen-rich water 112 was ocean water, and the depletion chamber 122 contained a 1% ocean mud solution. As shown in FIG. 9, the peristaltic pump ran for eight days with no power output, but that was by design. The circuit from anode 102 to cathode 106 was disconnected while pumping to build or "dam up" the unprocessed nutrients captured within the anode chamber 104. This way, the bacteria didn't accelerate their breakdown of the nutrients until the load 114 was introduced into the circuit. In this embodiment, the load 114 was a variable resistor load that was stepped down over time to gradually allow for current flow and to maintain the voltage level at approximately 0.4 Volts.

Figure 10:
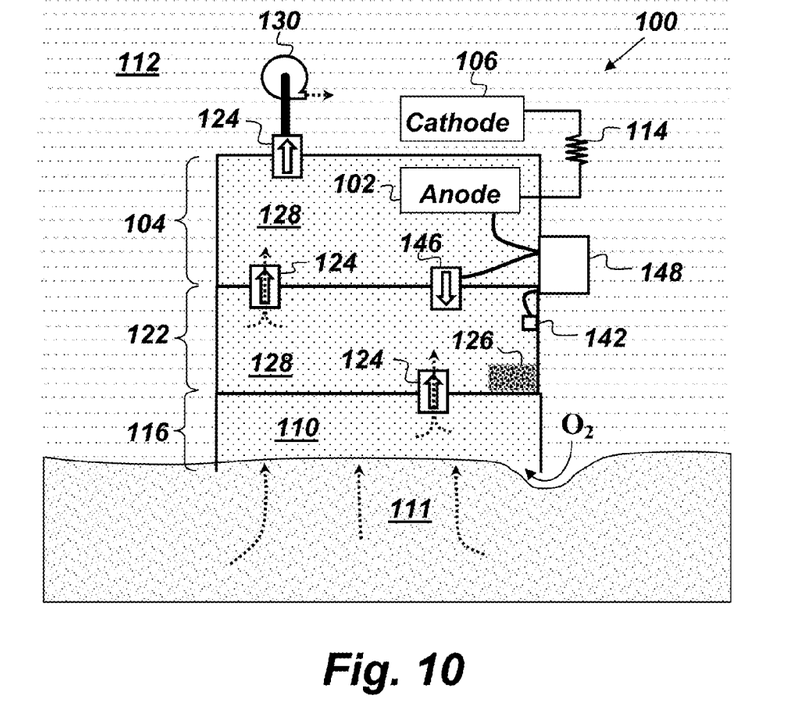
FIG. 10 is a side-view illustration of an embodiment of a microbial fuel cell.

FIG. 10 is a side-view illustration of a three-chamber embodiment of the MFC 100 comprising a switchable fluidic circuit 146 between the anode chamber 104 and the depletion chamber 122 and a processor 148. The processor 148 is operatively coupled to the switchable fluidic circuit 146, the anode 102, and the oxygen sensor 142. The processor 148 may be any logic circuit or computer capable of monitoring inputs and performing certain actions based on certain perceived conditions. For example, the processor 148 may be configured to open the switchable fluidic circuit 146 to recirculate the fluid in the anode chamber 104 back into the depletion chamber 122 after a given amount of electrons from the oxygen-reduced solution 128 are captured by the anode 102. The processor 148 may also be operatively coupled to the check valves 124 and configured to open the check valves 124 such that the oxygen-reduced solution 128 in the depletion chamber 122 is transferred to the anode chamber 104 when the oxygen sensor 142 detects a threshold level of oxygen in the depletion chamber 122.

Figure 11:
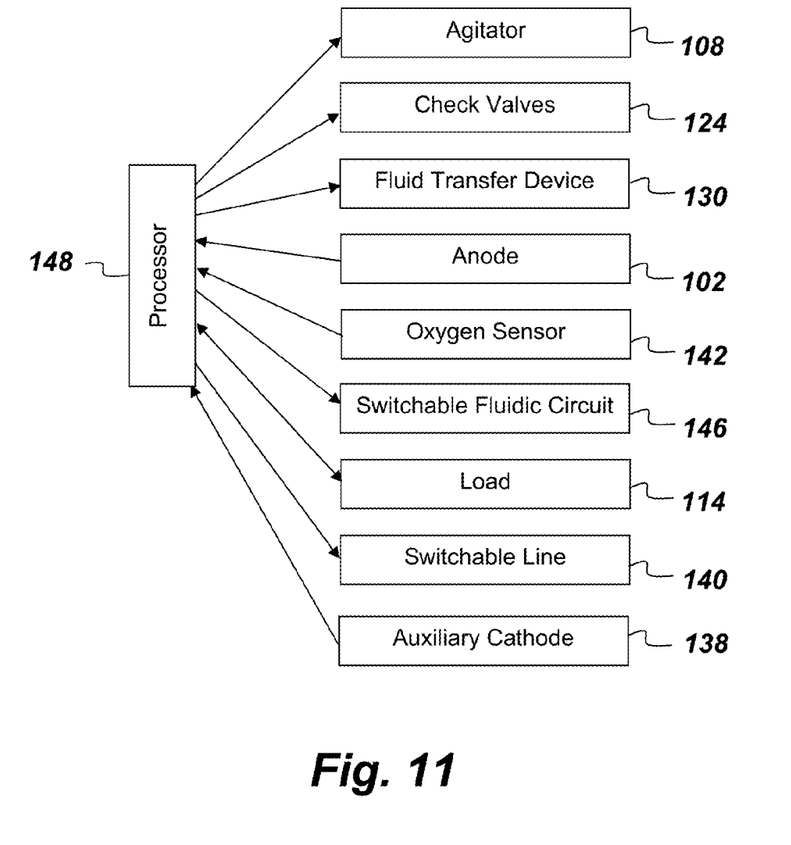
FIG. 11 is a chart showing interconnections between various elements of an embodiment of a microbial fuel cell.

FIG. 11 is a chart showing possible interconnections between various elements of an embodiment of the MFC 100. The processor 148 is shown operatively coupled to the anode 102, the agitator 108, the load 114, the check valves 124, the fluid transfer device 130, the switchable line 140, the auxiliary anode 138, the oxygen sensor 142, and the switchable fluidic circuit 146.

Figure 12:
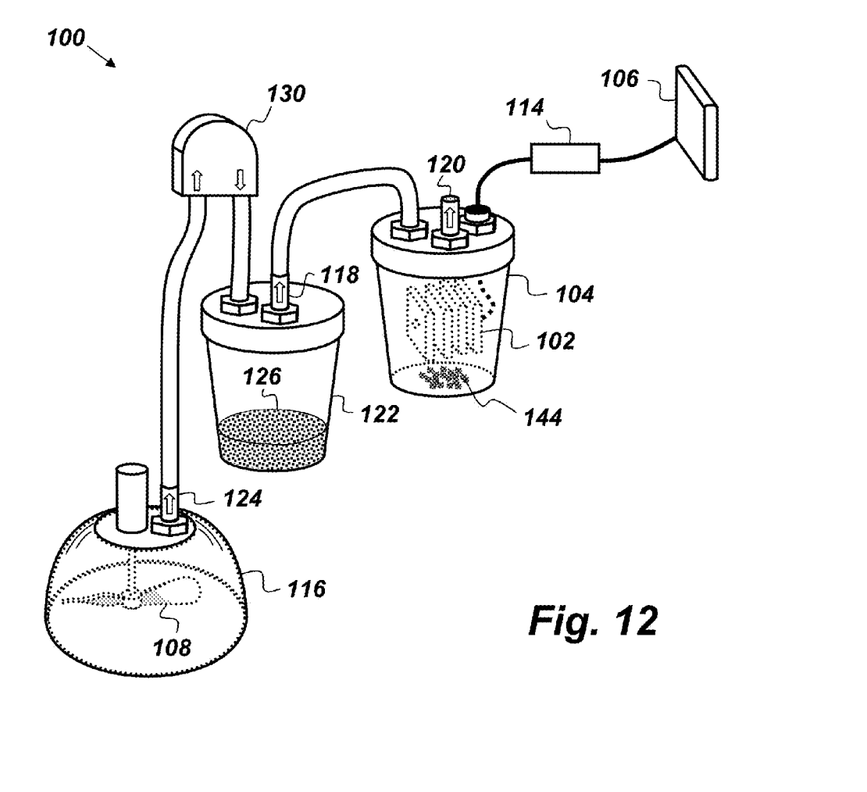
FIG. 12 is a perspective-view illustration of an embodiment of a microbial fuel cell.

FIG. 12 is a perspective view of an embodiment of the MFC 100 that is similar to the prototype embodiment shown in FIG. 8. This embodiment shows how the prototype embodiment shown in FIG. 8 would appear if coupled to the ingestion chamber 122 and the agitator 108. The embodiment of the MFC 100 shown in FIG. 12 would not require human interaction to operate.

From the above description of the MFC 100, it is manifest that various techniques may be used for implementing the concepts of the MFC 100 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the MFC 100 is not limited to the particular embodiments described herein, but is capable of many embodiments without departing from the scope of the claims.

We claim:

1. A microbial fuel cell comprising:
   an anode;
   an anode chamber configured to house the anode and an oxygen-reduced, nutrient-rich solution from a sediment bottom of a natural water body, wherein the anode chamber shields the anode from surrounding oxygen-rich water;
   an ingestion chamber hydraulically coupled to the anode chamber via at least one inlet check valve that permits the nutrient-rich solution to enter the anode chamber from the ingestion chamber, and wherein the ingestion chamber is configured to rest on, and partially sink into, the sediment bottom;
   a first cathode disposed outside the anode chamber in the oxygen-rich water and electrically coupled in series to the anode via an electrical load; and
   an agitator housed in the ingestion chamber and configured to periodically agitate the sediment bottom to increase the quantity of nutrients in the nutrient-rich solution.

2. The microbial fuel cell of claim 1, wherein the anode chamber comprises at least one exit check valve that permits fluid to exit the anode chamber into the surrounding water.

3. The microbial fuel cell of claim 2, further comprising a depletion chamber hydraulically coupled in series between the anode chamber and the ingestion chamber with check valves such that only one-way fluid flow is permitted from the ingestion chamber to the depletion chamber and then to the anode chamber, and wherein the depletion chamber contains an oxygen depleting substance capable of removing oxygen from the nutrient-rich solution in the depletion chamber.

4. The microbial fuel cell of claim 3, further comprising a fluid transfer device configured to cause the nutrient-rich solution to move through the ingestion chamber, the depletion chamber, and the anode chamber.

5. The microbial fuel cell of claim 4, wherein the fluid transfer device is a gas-filled balloon that is housed in one of the chambers such that as a hydrostatic pressure decreases and increases due to ambient forces the balloon expands and contracts respectively thereby forcing the nutrient-rich solution to move through the chambers.

6. The microbial fuel cell of claim 4, further comprising an auxiliary cathode disposed within the depletion chamber and electrically and switchably coupled to the first cathode.

7. The microbial fuel cell of claim 4, further comprising an oxygen sensor disposed in the depletion chamber, and wherein all the check valves are actively controlled and configured to only allow fluid to flow between chambers once the oxygen sensor detects a threshold level of oxygen in the depletion chamber.

8. The microbial fuel cell of claim 1, wherein the anode chamber further houses a microbial activity enhancing agent.

9. The microbial fuel cell of claim 1, wherein the agitator is selected from the group consisting of: an electro-mechanical device, an acoustic device, a pneumatic device, a blade, a roller, a rake, a plow, a blowing device, a rotating brush, an impeller, a propeller, a vibrator, and a device for releasing or injecting a fluid.

10. The microbial fuel cell of claim 3, wherein the load is a power supply for an autonomous platform that is configured to periodically lift the microbial fuel cell off the sediment bottom.

11. The microbial fuel cell of claim 3, further comprising an oxygen sensor disposed in the depletion chamber, and further comprising a switchable fluidic circuit between the anode chamber and the depletion chamber such that the nutrient-rich solution in the depletion chamber is transferred to the anode chamber when the oxygen sensor detects a threshold level of oxygen in the depletion chamber.

12. A microbial fuel cell comprising:
an anode;
an anode chamber configured to house the anode in an oxygen-reduced, nutrient-rich solution, wherein the anode chamber is further configured to prevent an oxygen-rich water from entering the anode chamber;
a depletion chamber hydraulically coupled to the anode chamber via at least one check valve, wherein the depletion chamber contains an oxygen-depleting substance capable of removing oxygen from fluid in the depletion chamber;
an ingestion chamber hydraulically coupled to the depletion chamber via at least one check valve, wherein the ingestion chamber has an open end that is configured to be exposed to a source of nutrient-rich solution, wherein the oxygen-rich water is ocean water and the ingestion chamber is configured to rest on, and partially sink into, an ocean floor thereby trapping nutrient-rich solution in the ingestion chamber;
a fluid transfer device configured to move the nutrient-rich solution from the ingestion chamber into the depletion chamber where the nutrient-rich solution is depleted of oxygen, wherein the fluid transfer device is further configured to move the oxygen-depleted solution from the depletion chamber into the anode chamber where electrons from the oxygen-depleted solution are captured by the anode, and wherein the fluid transfer device is further configured to move the oxygen-depleted solution out of the anode chamber into the oxygen-rich water; and
a cathode disposed outside the anode chamber in the oxygen-rich water, wherein the cathode is electrically coupled in series to the anode via an electrical load.

13. The microbial fuel cell of claim 12, further comprising a second cathode array disposed within the depletion chamber and electrically and switchably coupled to the cathode.

14. The microbial fuel cell of claim 13, further comprising an oxygen sensor disposed in the depletion chamber, and further comprising a switchable fluidic circuit between the anode chamber and the depletion chamber such that fluid in the depletion chamber is transferred to the anode chamber when the oxygen sensor detects a threshold level of oxygen in the depletion chamber.

15. The microbial fuel cell of claim 14, further comprising a processor operatively coupled to the anode and the oxygen sensor, wherein after electrons from the oxygen-depleted solution are captured by the anode the processor is configured to recirculate the fluid in the anode chamber back into the depletion chamber.

16. The microbial fuel cell of claim 14, further comprising an agitator disposed within the ingestion chamber, wherein the agitator is configured to periodically agitate the nutrient-rich solution within the ingestion chamber.

17. The microbial fuel cell of claim 16, wherein the load is a power supply for an autonomous platform that is configured to periodically touch down and lift off the ocean floor.

18. The microbial fuel cell of claim 16, wherein the anode chamber further houses carbon granules.

19. The microbial fuel cell of claim 16, wherein the agitator is powered by ambient flow-induced vibrations.

20. The microbial fuel cell of claim 19, wherein the oxygen-depleting substance is ocean sediment.

* * * * *